US005873294A

United States Patent [19]
Sciuto

[11] Patent Number: 5,873,294
[45] Date of Patent: Feb. 23, 1999

[54] SEMI-AUTOMATIC TOOL FOR CUTTING PIZZAS INTO PIECES OF THE SAME SIZE

[75] Inventor: Giovanni Sciuto, Osimo, Italy

[73] Assignee: Eurotecno, S.R.L., Italy

[21] Appl. No.: 786,124

[22] Filed: Jan. 17, 1997

[30] Foreign Application Priority Data

Jan. 26, 1996 [IT] Italy ................................ AN96A0002

[51] Int. Cl.[6] ............................ A21C 5/08; A21C 15/04; B26D 5/10; B26D 7/26

[52] U.S. Cl. ................................ 83/588; 83/564; 83/605; 83/608; 83/618; 83/633; 83/829; 83/932; 30/114; 30/303; 30/315

[58] Field of Search .................................. 30/114, 272.1, 30/273, 303, 315, 320, 321; 83/588, 605, 608, 618, 633, 527, 529, 829, 697, 533, 563, 564, 932

[56] References Cited

U.S. PATENT DOCUMENTS

| | | | |
|---|---|---|---|
| 863,340 | 8/1907 | Wright | 30/114 X |
| 1,560,090 | 11/1925 | Milestone | 30/114 X |
| 1,591,839 | 7/1926 | Karraz | 83/633 |
| 1,806,704 | 5/1931 | Pace | 83/588 X |
| 2,302,323 | 11/1942 | Hubbard | 30/114 |
| 2,373,781 | 4/1945 | Richardson | 83/588 X |
| 2,527,018 | 10/1950 | Luzzi | 83/608 X |
| 2,707,504 | 5/1955 | Hill | 30/564 |
| 2,906,020 | 9/1959 | Welsh | 30/114 |
| 3,378,923 | 4/1968 | Trush | 30/321 X |
| 4,250,618 | 2/1981 | Custer et al. | 30/114 |
| 5,014,584 | 5/1991 | Kozyrski et al. | 83/564 X |

FOREIGN PATENT DOCUMENTS

| | | | |
|---|---|---|---|
| 899182 | 5/1945 | France . | |
| 2252737 | 6/1975 | France | 30/303 |
| 597604 | 5/1934 | Germany . | |
| 675390 | 9/1990 | Switzerland . | |
| 180857 | 6/1922 | United Kingdom . | |

*Primary Examiner*—M. Rachuba
*Assistant Examiner*—Charles Goodman
*Attorney, Agent, or Firm*—Leonard Bloom

[57] ABSTRACT

A semi-automatic tool cuts pizzas into pieces of the same size. A platform has a supporting column provided with a cantilever arm terminating with a sleeve and a slidable rod is within the sleeve. The rod has a base with a series of radial blades on its lower face and a control lever on its upper face by means of which said rod is pressed downwards against the force of a return spring mounted on the rod.

6 Claims, 3 Drawing Sheets

SEMI-AUTOMATIC TOOL FOR CUTTING PIZZAS INTO PIECES OF THE SAME SIZE

This patent application concerns a semi-automatic tool for cutting pizzas into pieces of the same size.

BACKGROUND OF THE INVENTION

The tool is designed to resolve, economically and practically, a problem often encountered in pizza places where the pizza, as in the case of giant pizzas, is served in pieces of the same size to several customers. These special pizzas are generally prepared with different seasonings and ingredients so that one pizza can be cut into pieces with different seasoning.

These giant pizzas are generally served in pieces so that each person can take the piece—without having to cut it—with the seasoning and in the size he or she prefers.

To date these pizzas have been cut by hand using a bread knife or a special tool consisting of a saw-tooth wheel sliding idly about a supporting rod at the end of a handle.

In any case, regardless of whether a bread knife or the above cutting wheel is used, in order to cut the pizza into pieces, it is necessary to make repeated diameter cuts which require some care if all the pieces are to be of the same size; it is evident that despite the experience or ability of the person who cuts the pieces, it is practically impossible for them to be of exactly the same size.

BRIEF SUMMARY OF THE INVENTION

In view of the above, this semi-automatic tool is designed to cut pizzas into pieces of exactly the same size quickly and precisely.

The tool according to the invention consists of a cutting-board holder platform from whose edge projects an upright supporting column for a cantilever arm lying on a vertical plane passing through the center of the underlying cutting board. Said arm terminates with a sleeve in which a cylindrical rod slides and rotates, and whose base is provided with a plate having a series of regularly spaced radial blades on its lower face.

On said rod a cylindrical spiral spring is fitted which at the bottom touches the upper edge of said sleeve and at the top touches against a washer fitted at the top of the rod; it being provided that the latter may be pushed downwards together with the integral plate by means of a control lever pivoted on an element of the cantilever arm, above and coplanar to which the lever is positioned.

It is evident that the pizza is cut by pushing said rod downwards so that the blades and its plate are positioned on the underlying cutting board on which the pizza has been placed and centered.

During the downward stroke of the rod, the spring is compressed so that the upward stroke of the rod occurs automatically without any pressure on the part of the operator, thanks to the thrust of the spring as it slackens.

It is evident from this brief description of the tool according to the invention that the same makes it possible to cut a pizza into pieces of exactly the same size quickly and precisely.

Cutting the pizza into pieces of exactly the same size in fact no longer depends on the ability of the operator but on the precision with which the radial blades are spaced and fixed at regular intervals under the supporting plate. This means that by using the tool in question, the pizza can be cut quickly and easily even by persons who have no particular experience in this field.

Moreover, the operation is very fast in that with the tool in question, all the pieces are cut at the same time, whereas it is currently necessary to make repeated cuts, which are more numerous when the pizza is to be cut into many pieces.

For major clarity the description of the invention continues with reference to the enclosed drawing intended for purposes of illustration but not in a limiting sense where:

DETAILED DESCRIPTION OF THE INVENTION

Figure 1:
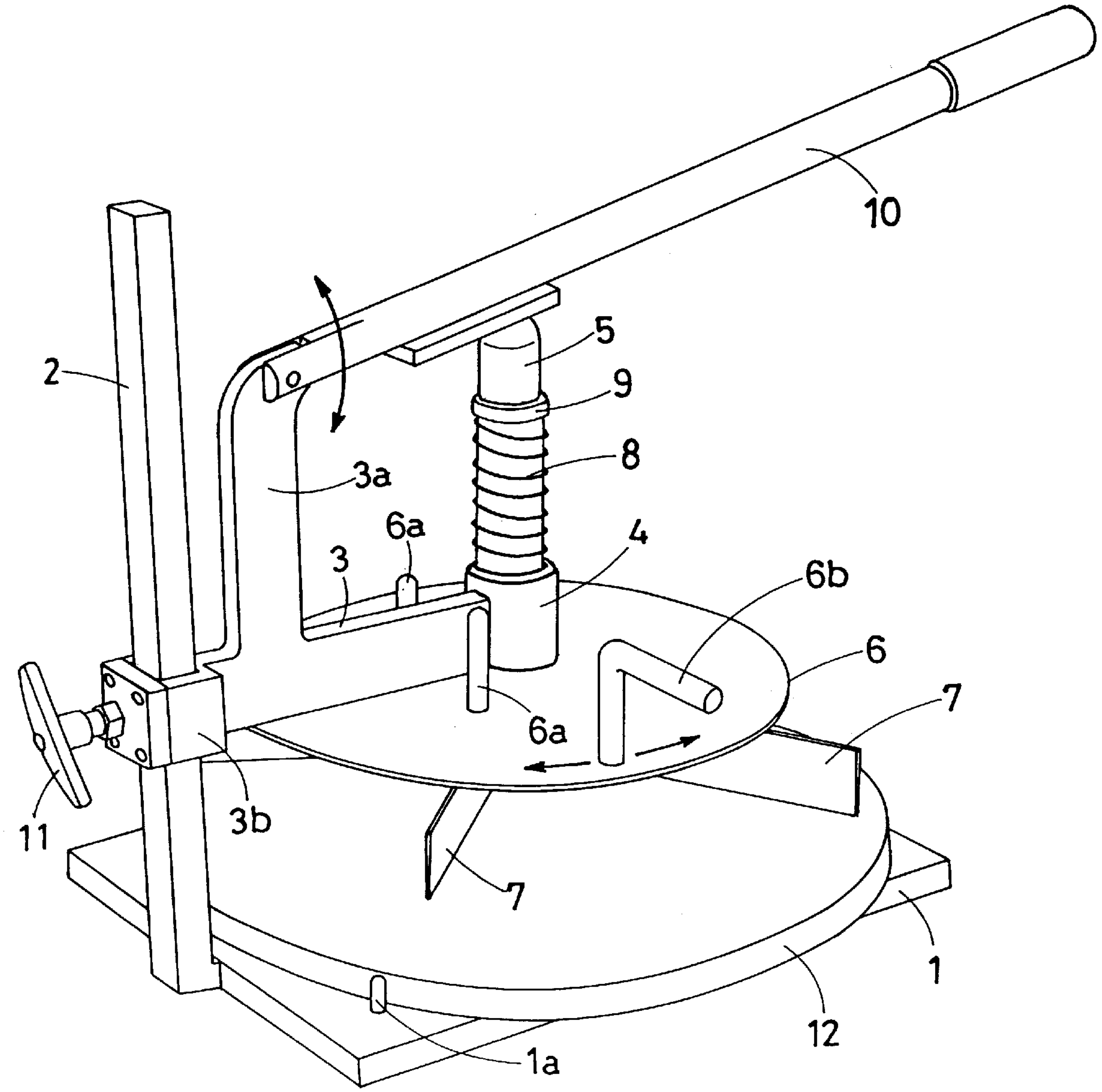
FIG. 1 is an isometric view of the first preferred embodiment of tool according to the invention.

With reference to the FIG. 1, the tool in question has a base comprising a cutting board holder platform (1) from whose edge projects an upright supporting column (2) for a cantilever arm (3) lying on a vertical plane passing through the center of the underlying platform (1). The horizontal arm (3) terminates with a sleeve (4) having a vertical axis in which a cylindrical rod (5) slides and rotates and whose base is provided with a plate (6) having a series of regularly spaced radial blades (7) on its lower face.

On the rod (5) a cylindrical spiral spring (8) is fitted which at the bottom touches the upper edge of said sleeve (4) and at the top touches against a washer (9) fitted at the top of the rod on which a control lever (10) is placed, the same being pivoted on an element (3*a*) of the cantilever arm (3), above and coplanar to which the lever (10) is positioned. Attention is drawn to the fact that the upper face of the plate (6) is provided with two pins (6*a*) positioned on opposite sides with respect to the arm (3) against which these pins (6*a*) touch alternatively rotating the plate (6) in one direction or the other, the plate (6) being provided with a handle (6*b*) designed to facilitate the rotation of the plate (6).

The center to center distance of the pins being such that the maximum rotation of the plate permitted by the same corresponds precisely to an angle equal to half of that between two consecutive blades (7) on the plate (6) in order to divide the pizza into an identical number of pieces corresponding to double that of the radial blades under the plate (6).

This feature is not designed simply to use as few blades as possible but above all to ensure a clean and exact cut even at the center of the pizza, approaching which the linear distance between the blades reduces gradually to nil. In other words, it was noticed that the cut towards the center of the pizza becomes irregular and uncertain if too many blades converge to the center.

On the basis of this very observation, it was decided firstly that the number of blades to use on the tool according to the invention should be half of the number of pieces to cut and secondly that the blade-holder plate should oscillate between the two end strokes, between which there is an angular distance equal to half that between two consecutive blades on the plate.

It is evident that in this way the operator may repeat the cutting operation twice, the first after having positioned one of the two pins (6*a*) against the arm (3) and the second after having rotated the plate (6) so that the other pin (6*a*) stops against the arm (3).

Finally, it should be noted that the arm (3) is fixed along the upright column (2) making it possible to disassemble it quickly and easily from the column to clean and wash the plate and blades fitted to the same.

In the preferred embodiment of the tool according to the invention illustrated in FIG. 1, this fast and easy assembly and disassembly of the arm (3) has been achieved by providing the arm with a second end sleeve (3*b*) fitted and sliding on the column (2) along which said sleeve (3*b*) may be fixed at the required height by means of a screw which is rotated quickly and easily by to a pull handle (11).

This means that by loosening the screw it is possible to draw the plate (6) up along the column (2) sufficiently to clean the blades (7) easily or even disassemble the arm (3) together with the plate (6) from the column (2).

Figure 2:
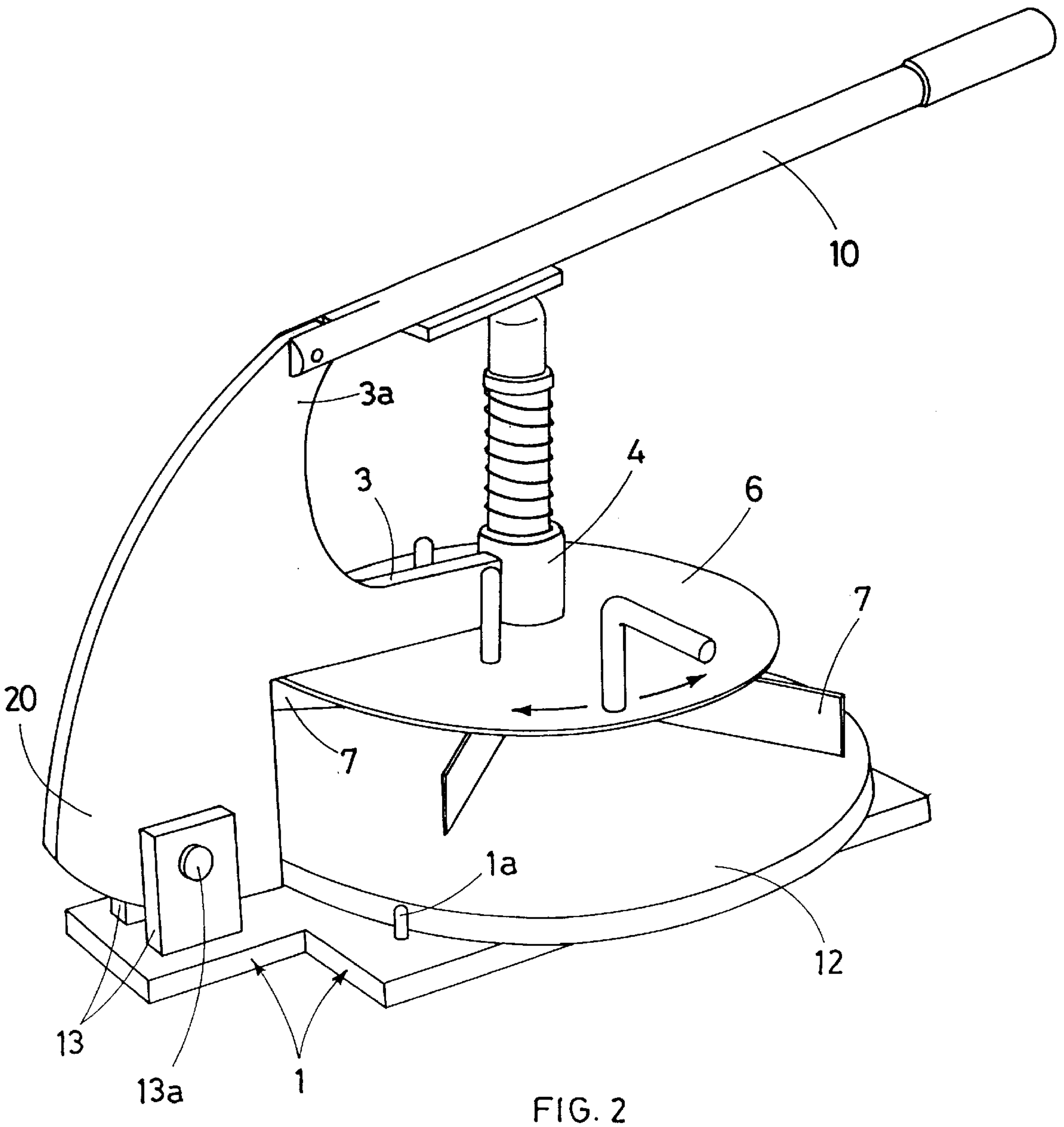
FIG. 2 is an isometric view of the second preferred embodiment of the tool according to the invention.

In an alternative embodiment, shown in FIG. 2 the arm (3) is an integral part of a column (20) pivoted at the base in a pair of lugs (13) on the back edge of platform (1), through which a horizontal pin (13*a*) fits.

This means that the column (20), if necessary, may be tipped backwards and towards the exterior so that it rests on the same supporting plane as the platform, in this case, the plate (6) is positioned vertically so as to easily check or clean the blades (7) of the plate (6).

A third preferred embodiment of the tool according to the invention is illustrated whereby the supporting plate (6) of the blades (7) does not rotate; in this case, a rotating plate above which the cutting board (12) is placed, is mounted above the platform (1).

Figure 3:
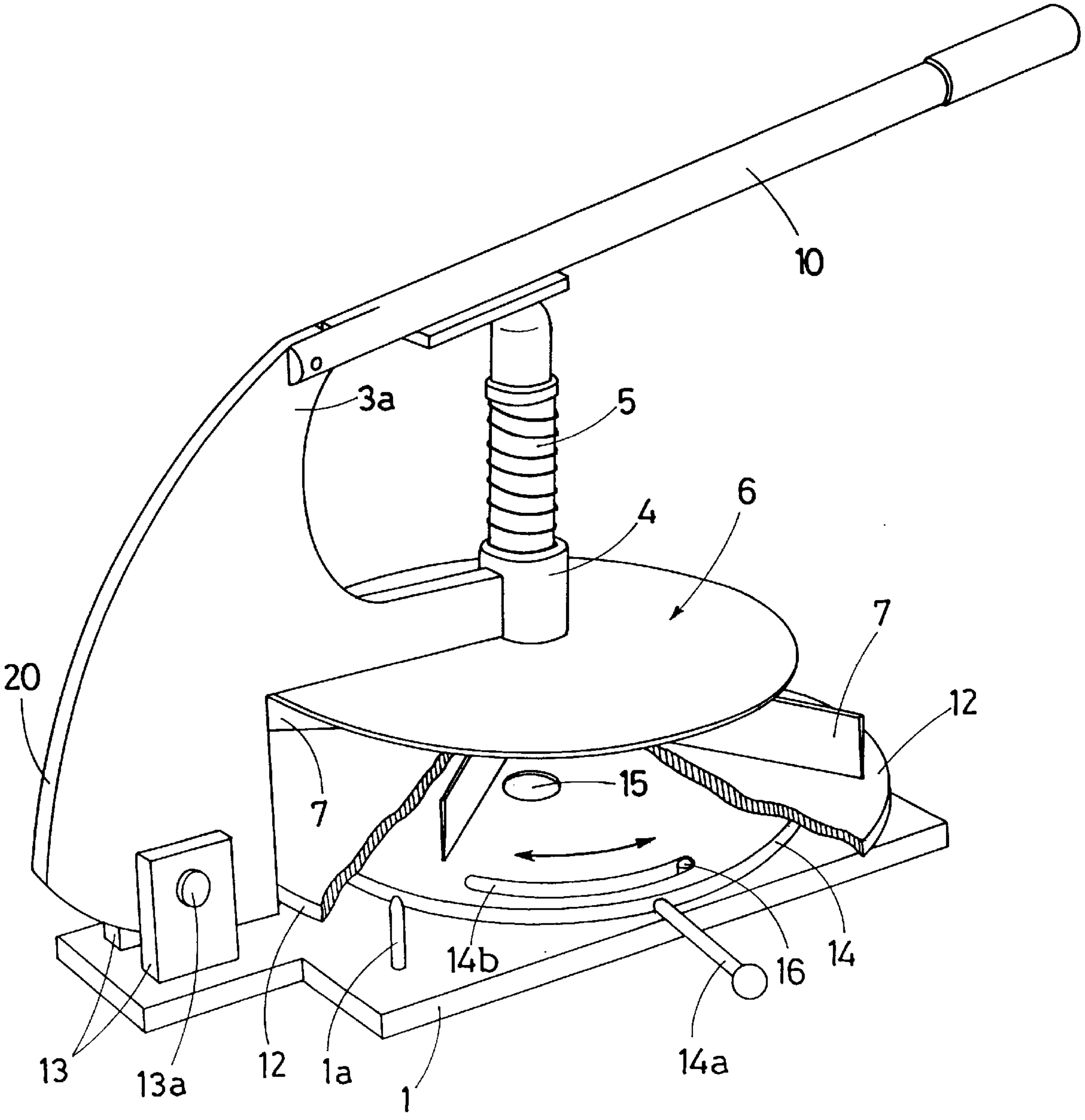
FIG. 3 is an isometric view of the third preferred embodiment of the tool according to the invention.

With reference to FIG. 3, in the case of the third preferred embodiment, a circular plate (14) is provided above the platform (1); this circular plate (14) rotates about a center pin (15) projecting from the platform (1) and perfectly coaxial to the support rod of plate (6).

Moreover, it should be noted that the rod (5) slides, but does not rotate in the sleeve (4).

The edge of said revolving plate (14) has a knob (14*a*) to rotate the plate (14) and the plate (14) has a perimeter slot (14*b*) in which a pin, fixed to the underlying platform (1), is fitted and slides.

This means that the plate (14) is free to rotate in clockwise and counter clockwise directions but only at a pre-set maximum angle depending on the length of the slot (14*b*).

It is evident that in this embodiment, the slot (14*b*), by co-operating with the pin (16), performs the same function that in the previous embodiments was performed by the pair of pins (6*a*) working together with the arm (3) between the same.

It should be noted in this respect that the maximum oscillation angle of the rotating plate (14) corresponds precisely to an angle equal to half of that between two consecutive blades (7) on plate (6) in order to cut the pizza into a number of pieces of the same size, double that of the radial blades under the plate (6).

Finally, it should be noted that in the case of all three versions, the platform (1) is provided with projecting pins (1*a*) against which the cutting board (12) must be placed in order to ensure precise and automatic centering of the cutting board itself with respect to the overlying blade-holder plate (6).

It is evident that the cutting board (12) rests directly on the platform (1) in the first two embodiments, while in the third embodiment the cutting board rests above the rotating plate (14).

Although the tool according to the invention is designed specifically for cutting pizza, it may obviously be used in the same way and just as efficiently to cut jam tarts, pies etc. even if the same do not have a circular profile but provided their shape is that of a regular polygon.

Finally, it should be noted that if the pizza is to be cut into the same number of pieces as the number of blades (7), it is not even necessary to make a double cut.

Even in this case, the tool according to the invention is extremely practical in that with just one cut it quickly and precisely cuts the pizza into pieces of the same size.

I claim:

1. In a tool for cutting a pizza, wherein the pizza is substantially circular and has a center portion, wherein the tool cuts the pizza cleanly and evenly through the center portion thereof, wherein the tool includes a fixed member having respective sides and further includes a spring-loaded lever for manually pressing a circular plate downwardly thereof, the plate having a center axis and carrying a plurality of circumferentially-spaced cutting blades depending therefrom, the blades forming an angle therebetween, and wherein the pizza is supported on a cutting board below the plate, the improvement wherein the plate is rotatable about the center axis and is provided with at least a pair of upstanding pins straddling the fixed member and disposed equidistantly therefrom, the pins being further disposed radially of the center axis of the plate, each of the pins having a longitudinal center axis and a center-to-center distance between the respective axes of the pins being such that a maximum rotation of the plate is substantially one-half of an angle between two consecutive blades depending from the plate, whereby the plate may be rotated in a first direction and through an angle such that one of the pins abuts against a respective side of the fixed member on the tool, whereby the spring-loaded lever may be depressed to make a first cut into the pizza and then released, whereby the plate may then be rotated through an angle in the opposite direction such that the other pin abuts against the other respective side of the fixed member on the tool, and whereby the spring-loaded lever may again be depressed to make a second cut into the pizza, such that the pizza is cut into a number of pieces which is twice the numbers of blades.

2. The improvement of claim 1, wherein the plate is provided with a handle for manually rotating the plate.

3. The improvement of claim 1, further including a platform for supporting the cutting board, the platform being provided with a plurality of circumferentially-spaced pins for accurately aligning the cutting board relative to the plate.

4. The improvement of claim 3, wherein the tool includes a vertical column secured to the platform, and wherein the fixed member includes an arm cantilever mounted on the column, projecting radially of the column, and vertically adjustable thereon.

5. The improvement of claim 4, wherein the arm is provided with a member projecting upwardly therefrom substantially parallel to the vertical column and spaced therefrom, and wherein the spring-loaded lever is pivotably secured to the upwardly-projecting member.

6. The improvement of claim 3, wherein the fixed member comprises a column pivotably mounted on the platform, and wherein the spring-loaded lever is secured to the column.

* * * * *